Aug. 25, 1959  F. A. ZELETZKY ET AL  2,900,843

TRANSMISSION

Filed July 11, 1955

*INVENTORS.*
FRANZ A. ZELETZKY
ROSS M. G. PHILLIPS
BY
ATTORNEY

United States Patent Office 2,900,843
Patented Aug. 25, 1959

2,900,843

TRANSMISSION

Franz A. Zeletzky, Bridgeport, and Ross M. G. Phillips, Sandy Hook, Conn., assignors to The Bullard Company, a corporation of Connecticut Application July 11, 1955, Serial No. 521,079

12 Claims. (Cl. 74—665)

The present invention relates to transmissions, and particularly to a new and improved variable-speed transmissioin having two locations of power input and four locations of power output. This invention is related to that shown, described and claimed in application Serial No. 458,110, filed September 24, 1954, in the name of Claude M. Grinage, now Patent No. 2,887,906, dated May 26, 1959.

The principal object of this invention is to provide a transmission in which a common variable-speed device can be employed to provide power for four output shafts, which variable-speed device is susceptible of being driven selectively at a constant rate of speed or at a variable rate of speed.

Other objects include the provision of a multiple speed transmission that can be supplied with a constant or variable input speed so that the output speed of the transmission may have a dual relation to the input speed; and the provision of such a transmission in which four output shafts are adapted to be driven at a constant rate of speed or to be driven by a variable-speed transmission which latter is adapted alternatively to be supplied with power from two different sources.

Figure 1:
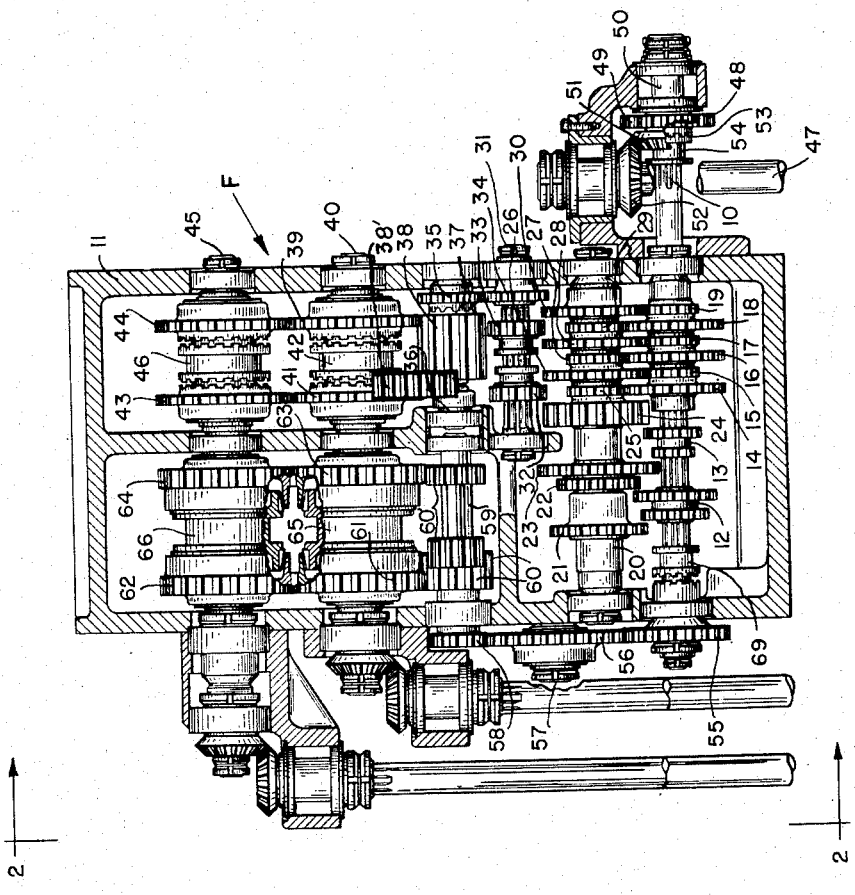
Figure 2:
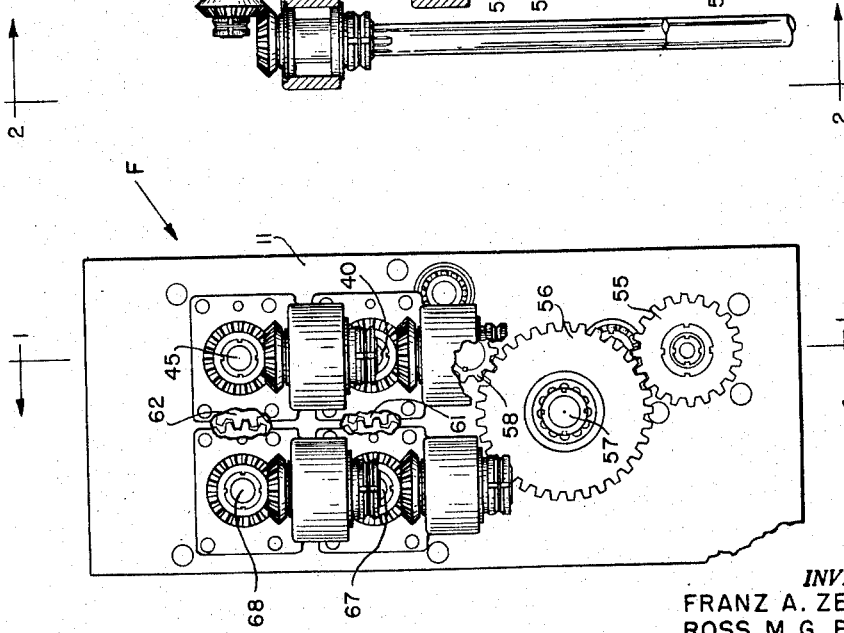

The above, other objects and novel features of the invention will become apparent from the following specification in light of the accompanying drawings, in which:

Figure 1 is a sectional elevational view of a transmission to which the principles of the invention have been applied, and as viewed by looking in the direction of the arrows along line 1—1 of Fig. 2; and Fig. 2 is an end view of the transmission shown in Fig. 1, and looking in the direction of the arrows as viewed along line 2—2 of Fig. 1.

Referring to Figs. 1 and 2, the principles of the invention have been shown as applied to the feedworks F of a horizontal boring mill which comprises an input shaft 10 mounted within a frame 11. The shaft 10 has splined to it two gear clusters 12 and 13. A plurality of speed reduction gears 14, 15, 16, 17, 18 and 19 are journaled on the input shaft 10. A secondary shaft 20 mounted in the frame 11 in parallel relation with the shaft 10 fixedly supports spur gears 21, 22, 23 and 24. The shaft 20 also has journaled on it intermeshing speed reducing gears 25, 26, 27, 28, 29 and 30. Gears 14 and 15 are integral, as are gears 16, 17; 18, 19; 24, 25; 26, 27; and 28, 29. A tertiary shaft 31 parallel to shafts 20 and 10 is also mounted within the frame 11 and it supports shiftable gears 32 and 33. Also fixed to the shaft 31 is a spur gear 34 that meshes with a spur gear 35 on a shaft 36 which latter is mounted within the frame 11. A safety-rattle clutch 37 is provided between the gear 35 and a gear 38 that meshes with a gear 39 on a shaft 40 within the frame 11. The gear 38 also meshes with a gear 38' that meshes with a gear 41 also mounted on the shaft 40. Accordingly, the gears 39 and 41 are rotated in a reverse direction by the gear 38. A positive-action clutch 42 is mounted between the gears 39 and 41 for connecting either to the shaft 40 to thereby effect the latter's rotation in either a forward or reverse direction and at a speed depending upon the speed of rotation of gear 38.

Gears 39 and 41 mesh with gears 43 and 44 journaled on a shaft 45 parallel to the shaft 40 within the frame 11. A positive-action clutch 46 is located between the gears 43 and 44 so that shaft 45 can be rotated in either direction, depending upon the shifting of the clutch 46.

From the foregoing description of the feedworks transmission, it is evident that selectively shifting the gear clusters 12 and 13 can produce four rates of rotation of the shaft 20; and, selectively shifting the shiftable gears 32 and 33 will produce 16 different rates of rotation of the shaft 36 and, consequently, the gears 39, 41, 43 and 44. Accordingly, the feedworks is capable of rotating the output shafts 40 and 45 in either direction at any one of 16 different feed rates.

The feed rates of the output shafts 40 and 45 can be related to the rotation of a shaft 47 that is supplied with power from another variable-speed transmission, or they may be independent of such other variable-speed transmission. To accomplish this, a spur gear 48 journaled on the input shaft 10 meshes with a spur gear 49 on a back shaft 50. A bevel gear 51 on the back shaft 50 meshes with a bevel gear 52 fixed to the shaft 47 that may be driven by a separate variable-speed transmission. The gear 48 is integral with one part 53 of a positive-action clutch 54. With clutch 54 in the position shown, power is supplied to the input shaft 10 from the shaft 47.

In order to cause the shafts 40 and 45 to be rotated at a relatively rapid traverse rate in either direction, a spur gear 55 (Fig. 1) that is adapted to be driven at a constant relatively fast rate, is journaled on the input shaft 10. The gear 55 meshes with a gear 56 journaled on a stub shaft 57 mounted on the frame 11 of the feedworks F. Gear 56 meshes with a pinion 58 that is fixed to a shaft 59 within the bracket 11 and aligned with, but separated from the shaft 36.

A gear 60 on the shaft 59 meshes with a gear 61 journaled on the shaft 40 which in turn meshes with a gear 62 journaled on the shaft 45. The gear 60 on the shaft 59 also meshes with a gear 60' that meshes with a gear 63 journaled on shaft 40. Another gear 64 journaled on shaft 45 meshes with the gear 63. Friction clutches 65 and 66 are provided between gears 61 and 63 on shaft 40, and between gears 62 and 64 on shaft 45, respectively. From the foregoing, it is evident that the shafts 40 and 45 can be caused to rotate in either direction at a relatively rapid traverse rate of speed by selectively shifting the friction clutches 65 and 66.

Referring to Fig. 2, the gears 39, 41, 43, 44, 61, 63, 62 and 64 mesh with identical gears on additional shafts 67 and 68 arranged in parallel relation with the shafts 40 and 45 within the bracket 11 of the feedworks F. In this way, the shafts 40, 45, 67 and 68 can be rotated in either direction at any one of 16 different rates of feed as well as rotated in either direction at a relatively rapid traverse rate of speed. In horizontal boring mills, to which the transmission of this invention is particularly applicable, it is often desirable to move the various elements that are driven by shafts such as 40, 45, 67 and 68, at a feed rate that is measured in inches per minute or feet per minute as distinguished from inches per revolution of a spindle which itself is rotated at variable speeds. This has been accomplished in the present invention by employing a clutch 69 (Fig. 1) splined on the input shaft 10 and which clutch is adapted to be moved into engagement with a mating clutch fixed to the gear 55 simultaneously with the disengagement of the clutch 54. In this case, a relatively rapid constant speed can be employed to operate the speed reduction units including the shiftable gears 12, 13, 32 and 33. When the input shaft 10 supporting the speed reduction unit of the feedworks is driven through the clutch 69, the feed rate of the shafts 40, 45, 67 and 68 is measured in inches per minute rather than inches per revolution, which latter is effected when shaft 10 is driven through clutch 54.

Although the various features of the new and improved transmission have been shown and described in detail to fully disclose one embodiment of the invention, it will be evident that numerous changes may be made in such details, and certain features may be used without others, without departing from the principles of the invention.

What is claimed is:

1. A transmission comprising in combination, an input shaft; four output shafts; four sets of four intermeshing gears each on said four output shafts; means for driving a gear in each of two of said sets in opposite directions; separate means for driving a gear in each of the remaining two sets in opposite directions; a variable speed mechanism drivingly connected to said separate means; and means for alternatively driving said variable speed mechanism from two power sources including said first-mentioned driving means.

2. A transmission comprising in combination, an input shaft; four output shafts; four sets of four intermeshing gears each on said four output shafts; means for driving a gear in each of two of said sets in opposite directions; means journaled on said input shaft for driving said means; separate means for driving a gear in each of the remaining two sets in opposite directions; a variable speed mechanism drivingly connected to said separate means; and means for alternatively driving said variable speed mechanism from two power sources including said driving means journaled on said input shaft.

3. A transmission comprising in combination, an input shaft; four output shafts; four sets of four intermeshing gears each on said four output shafts; means for driving a gear in each of two of said sets in opposite directions; means journaled on said input shaft for driving said means; separate means including an overload clutch device for driving a gear in each of the remaining two sets in opposite directions; a variable speed mechanism drivingly connected to said separate means; and means for alternatively driving said variable speed mechanism from two power sources including said driving means on said input shaft.

4. A transmission comprising in combination, an input shaft; four output shafts; four sets of four intermeshing gears each on said four output shafts; means for driving a gear in each of two of said sets in opposite directions; means journaled on said input shaft for driving said means; separate means including an overload clutch for driving a gear in each of the remaining two sets in opposite directions; a variable speed mechanism including change-gear means on said input shaft drivingly connected to said separate means; and means for alternatively driving said variable speed mechanism from two power sources including said driving means on said input shaft.

5. A transmission comprising in combination, an input shaft; four output shafts; four sets of four intermeshing gears each on said four output shafts; means for driving a gear in each of two of said sets in opposite directions; means journalled on said input shaft for driving said means; separate means including an overload clutch for driving a gear in each of the remaining two sets in opposite directions; a variable speed mechanism including change-gear means on said input shaft drivingly connected to said separate means; and clutches on said input shaft for alternatively causing said change-gear means to be driven by either of two separate power sources including said driving means on said input shaft.

6. A transmission comprising in combination, an input shaft; four output shafts; a primary unit driven by said input shaft and including a pair of cluster gears splined to said input shaft; a secondary shaft having four gears fixed thereto and adapted selectively to be enmeshed with the cluster gears on said input shaft; a plurality of intermeshing gears on said input shaft and secondary shaft forming a speed-reduction unit, one of said four gears on said secondary shaft being fixed to one of the gears on said speed-reduction unit; means for drivingly connecting two gears on each of said four output shafts with said primary unit; means independent of said input shaft for driving two other gears on each of said four output shafts; and means for connecting said primary unit alternatively to said input shaft or the driving means that is independent of said input shaft.

7. A transmission comprising in combination, an input shaft; four output shafts; a primary unit driven by said input shaft and including a pair of cluster gears splined to said input shaft; a secondary shaft having four gears fixed thereto and adapted selectively to be enmeshed with the cluster gears on said input shaft; a plurality of intermeshing gears on said input shaft and secondary shaft forming a speed-reduction unit, one of said four gears on said secondary shaft being fixed to one of the gears on said speed-reduction unit; oppositely-rotatable means for drivingly connecting two gears on each of said four output shafts with said primary unit; means independent of said input shaft for driving two other gears on each of said four output shafts; and means for connecting said primary unit alternatively to said input shaft or the driving means that is independent of said input shaft.

8. A transmission comprising in combination, an input shaft; four output shafts; a primary unit driven by said input shaft and including a pair of cluster gears splined to said input shaft; a secondary shaft having four gears fixed thereto, and adapted selectively to be enmeshed with the cluster gears on said input shaft; a plurality of intermeshing gears on said input and said secondary shafts forming a speed-reduction unit, one of said four gears on said secondary shaft being fixed to one of the gears of said speed-reduction unit; oppositely-rotatable means for drivingly connecting two gears on each of said four output shafts with said primary unit; means independent of, but journaled on said input shaft for driving two other gears on each of said output shafts; and means for connecting said primary unit alternatively to said input shaft or the driving means that is independent of, but journaled on said input shaft.

9. A transmission comprising in combination, an input shaft; four output shafts; a primary unit driven by said input shaft and including a pair of cluster gears splined to said input shaft; a secondary shaft having four splined to said input shaft; a secondary shaft having four gears fixed thereto, and adapted selectively to be enmeshed with the cluster gears on said input shaft; a plurality of intermeshing gears on said input and secondary shafts forming a speed-reduction unit, one of said four gears on said secondary shaft being fixed to one of the gears of said speed-reduction unit; oppositely-rotatable means for drivingly connecting two gears on each of said four output shafts with said primary unit; means independent of, but journaled on said input shaft for driving two other gears on each of said four output shafts; and clutches on said input shaft for connecting said primary unit alternatively to said input shaft or the driving means that is independent of, but journaled on said input shaft.

10. A transmission comprising in combination, a primary unit including an input shaft; a pair of cluster gears splined to said input shaft; a secondary shaft having four gears fixed thereto and adapted selectively to be enmeshed with the cluster gears on said input shaft; a plurality of intermeshing gears on said input and secondary shafts forming a speed-reduction unit, one of said four gears on said secondary shaft being fixed to one of the gears of said speed-reduction unit; a plurality of output shafts for said transmission; gears on said output shafts adapted to be driven by said primary unit; other gears on said output shafts; means for driving said other gears independently of said primary unit; and means for supplying two separate sources of power to said primary unit, including that supplied to the independently driven gears on said output shaft.

11. A transmission comprising in combination, a primary unit including an input shaft; a pair of cluster gears splined to said input shaft; a secondary shaft having four gears fixed thereto, and adapted selectively to be enmeshed with the cluster gears on said input shaft; a plurality of intermeshing gears on said input and secondary shafts, forming a speed-reduction unit, one of said four gears on said secondary shaft being fixed to one of the gears of said speed-reduction unit; a plurality of output shafts for said transmission; gears on said output shafts adapted to be driven by said primary unit; other gears on said output shafts; means journaled on said input shaft for driving said other gears independently of said primary unit; and means for supplying two separate sources of power to said primary unit including that supplied to the independently driven gears by the means journaled on said input shaft.

12. A transmission comprising in combination, a primary unit including an input shaft; a pair of cluster gears splined to said input shaft; a secondary shaft having four gears fixed thereto, and adapted selectively to be enmeshed with the cluster gears on said input shaft; a plurality of intermeshing gears on said input and secondary shafts forming a speed-reduction unit, one of said four gears on said secondary shaft being fixed to one of the gears of said speed-reduction unit; a plurality of output shafts for said transmission; gears on said output shafts adapted to be driven by said primary unit; other gears on said output shafts; means journaled on said input shaft for driving said other gears independently of said primary unit; and clutches on said input shaft for supplying two separate sources of power to said primary unit including that supplied to the independently driven gears by the means journaled on the input shaft.

References Cited in the file of this patent

UNITED STATES PATENTS

| | | |
|---|---|---|
| 2,346,660 | Bullard et al. | Apr. 18, 1944 |
| 2,355,623 | Bullard | Aug. 15, 1944 |

UNITED STATES PATENT OFFICE
CERTIFICATE OF CORRECTION

Patent No. 2,900,843                                                August 25, 1959

Franz A. Zeletzky et al.

It is hereby certified that error appears in the printed specification of the above numbered patent requiring correction and that the said Letters Patent should read as corrected below.

Column 4, line 53, strike out "splined to said input shaft; a secondary shaft having four".

Signed and sealed this 1st day of March 1960.

(SEAL)
Attest:

KARL H. AXLINE
Attesting Officer

ROBERT C. WATSON
Commissioner of Patents